Dec. 29, 1931.   E. F. BAKER   1,838,089
STEAM TRAP
Filed Dec. 14, 1929
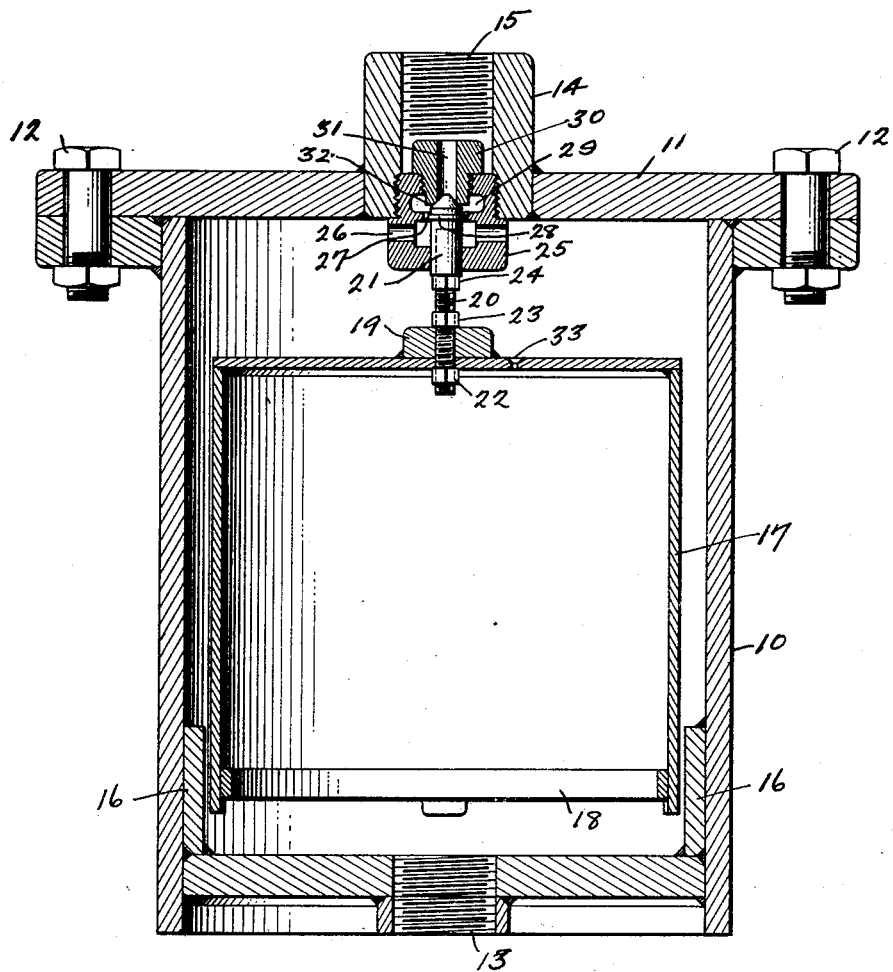
INVENTOR
E. F. Baker
BY
marvin w. Cheppell
ATTORNEY Patented Dec. 29, 1931

1,838,089

UNITED STATES PATENT OFFICE

ERICH F. BAKER, OF LONG BEACH, CALIFORNIA

STEAM TRAP

Application filed December 14, 1929. Serial No. 414,071.

This invention relates to improvements in steam traps and has for its principal object the provision of a simplified steam trap of durable construction having but one moving part.

Another object of the invention is to provide a steam trap having a greater capacity for the same size casing than other known types of steam traps.

Another object is to provide a direct acting valve for the trap which is free to turn on its seat thus assuring even seating and even wear on the valve seat.

A further object is to provide a valve construction which reduces erosion by reducing the velocity of liquids passing the valve and seat.

In the drawing, a casing 10 is provided with a cover 11 and held in air-tight relation thereto by bolts 12.

The bottom of casing 10 has a threaded passage 13 for connecting a steam pipe thereto and cover 11 is provided with a boss 14 in which a threaded passage 15 may receive a discharge pipe.

The interior of casing 10 has peripheral guides 16 for centrally guiding an open ended bucket or float 17 having a reinforcing ring 18 around its lower open end.

A boss 19 on the upper end of bucket 17 receives the threaded stem 20 of a valve 21, adjustments in position of the valve 21 with respect to the bucket 17 and stem 20 being provided by lock nuts 22, 23, 24.

In the lower end of boss 14 a fitting 25 is threaded which fitting forms a guide for valve 21 and has inlet passages 26 and a discharge passage 27, the diameter of the latter being of predetermined size compared with a collar 28 fixed on the upper part of valve 21.

An annular groove 29 is cut in fitting 25 and a plug 30 having a discharge passage 31 is provided with a seat 32 at its lower end for valve 21, said seat being inserted into groove 29. A small air vent 33 is located in the upper part of bucket 17.

As is well known in steam trap operation, in the position illustrated condensed steam has just been discharged from casing 10. Further condensate collecting therein will accumulate until there is insufficient buoyancy in bucket 17 to sustain valve 21 on seat 32 against the steam pressure.

At this time valve 21 will start to break away from seat 32 but the position and size of collar 28 is such as to prevent the full opening of passage 27.

In consequence, the water passes at high velocity past collar 28 and is directed partly into annular groove 29 whereby a swirling action is set up, to the end that water passing out of passage 31 past seat 32 is at comparatively low velocity until the full opening of valve 21 is attained, which permits a full discharge to take place.

Such low velocity is conducive to minimum erosion effects on valve 21 and seat 32, whereby long life is assured. At the same time bucket 17 and valve 21 are free to revolve, thereby working evenly on seat 32.

The high velocity of the water past collar 28 aids in maintaining bucket 17 in an upper position until such time as there has been a sufficient discharge of water to permit valve 21 to open wide.

At the wide open position there will remain but a minimum amount of water to discharge, but during such minimum discharge groove 29 is still effective in reducing the velocity of discharge for the same effects.

In the construction described, the parts 25 and 30 comprise a valve seat portion in which the normal discharge velocity is reduced, such normal discharge taking place in structures without my improvements or where neither the collar 28 nor groove is provided.

I claim as my invention:

1. A steam trap comprising a casing having a steam inlet and a discharge outlet, a float in the casing, a valve connected to the float, a seat for the valve in the discharge passage, and means in the discharge passage for increasing and then reducing the normal velocity of material passing from the casing to the discharge passage; said means including a deflector collar on the valve and an annular groove between said collar and the discharge outlet to receive material deflected by said collar first at a high velocity and thereafter at a lower velocity when the valve is opening.

2. A steam trap comprising a casing having a steam inlet and a water outlet, a float in the casing, a valve connected to the float, means in the casing to guide said float and valve centrally of the casing while freely revolvable therein, a seat for said valve in the outlet, a collar on the valve, and an annular groove in the outlet between said collar and said seat to receive material deflected by said collar first at a high velocity and thereafter at a lower velocity when the valve is opening.

3. In a steam trap the combination of: a casing having a steam inlet and a fluid discharged outlet, a float, a valve connected to the float, and means to regulate the discharge of fluid from the casing; said means comprising an annular collar on said valve, a valve fitting in the outlet having a central passage substantially the same length as said collar but of slightly greater diameter, a seat in the fitting for said valve concentric with said passage and so located as to bring said collar within said passage when the valve is seated, and an annular groove between said passage and said seat.

4. In a steam trap the combination of: a casing having a steam inlet and a fluid discharge outlet, a float, a valve connected to the float, and means to regulate the discharge of fluid from the casing; said means comprising an annular collar on said valve, a valve fitting in the outlet having a central passage substantially the same length as said collar but of slightly greater diameter, a seat in the fitting for said valve concentric with said passage and so located as to bring said collar within said passage when the valve is seated, an annular groove between said passage and said seat, and a guide for said valve in the lower part of the fitting distant from said central passage but concentric therewith.

5. In a steam trap the combination of: a casing having a steam inlet and a fluid discharge outlet, a float, a valve connected to the float, and means to regulate the discharge of fluid from the casing; said means comprising an annular collar on said valve, a valve fitting in the outlet having a central passage substantially the same length as said collar but of slightly greater diameter, a seat in the fitting for said valve concentric with said passage and so located as to bring said collar within said passage when the valve is seated, an annular groove between said passage and said seat, a guide for said valve in the lower part of the fitting distant from said central passage but concentric therewith, and means to adjust the position of said valve with respect to said float.

In testimony whereof I affix my signature.

ERICH F. BAKER.